United States Patent [19]

Dubois et al.

[11] 4,333,709

[45] Jun. 8, 1982

[54] MIXTURE OF DISC-LIKE LIQUID CRYSTALS, ELECTRO-OPTICAL DEVICE USING SUCH A MIXTURE AND PROCESS FOR ORIENTING THE MOLECULES OF THE MIXTURE

[75] Inventors: Jean-Claude Dubois; Annie Zann; Jean Billard; Michel Hareng, all of Paris, France

[73] Assignee: Thomson-CSF, Paris, France

[21] Appl. No.: 212,598

[22] Filed: Dec. 3, 1980

[30] Foreign Application Priority Data

Dec. 7, 1979 [FR] France .................................. 79 30121
Feb. 22, 1980 [FR] France .................................. 80 03977

[51] Int. Cl.$^3$ ............................ C09K 3/34; G02F 1/13
[52] U.S. Cl. ............................ 350/350 R; 252/299.4; 252/299.62; 252/299.6
[58] Field of Search ............. 252/299.62, 299.6, 299.4, 252/299.5; 350/350 R, 340, 341

[56] References Cited

FOREIGN PATENT DOCUMENTS

2297201 8/1976 France ........................... 252/299.01
2377441 8/1978 France ........................... 252/299.01

OTHER PUBLICATIONS

Billard, J., et al., Noveau J. de Chemie, vol. 2, No. 5, pp. 535–540, (1978).
Destrade, C., et al., J. de Phys. Colloque C3, Suppl. No. 4, to vol. 40, pp. 17–21, (1979).
Beguin, A., et al., J. de Phys. Colloque C3, Suppl. No. 4, to vol. 40, pp. 15–16, (1979).
Billard, J., Liquid Crystals of One- and Two-Dimensional Order, Proceedings of the Conf. on Liq. Cryst. of One- and Two-Dimensional Order and Their Applications, Garmish-Partenkirchen, Fed. Rep. of Germany, Jan. 21–25, 1980, pp. 383–395, Springer-Verlag, N.Y.
Kleman, M., Liquid Crystals of One- and Two-Dimensional Order, Proceedings of the Conf. on Liq. Cryst. of One- and Two-Dimensional Order and Their Applications, Garmish-Patenkirchen, Fed. Rep. of Germany, Jan. 21–25, 1980, pp. 97–106, Springer-Verlag, N.Y.
Tinh, N., et al.; Physics Letters, vol. 72A, No. 3, pp. 251–254, (Jul. 1979).
Levelut, A. M., J. Phys. Lett., vol. 40, No. 4, pp. L-81-L-84, (Feb. 1979).
Goodby, J. W., et al., Mol. Cryst. Liq. Cryst., vol. 56, (Letters), pp. 303–309, (1980).
Destrade, C., et al., Mol. Cryst. Liq. Cryst., vol. 49, (Letters), No. 6, pp. 169–174, (1979).
Kelker, H., et al., Mol. Cryst. Liq. Cryst., vol. 49 (Letters), pp. 175–177, (1979).
Chemical Abstracts, vol. 91, 1979, p. 586, 91:100137x.
Brown, editor; Molecular Crystals and Liquid Crystals, vol. 49, (Letters), pp. 169 and 175.

*Primary Examiner*—Teddy S. Gron
*Attorney, Agent, or Firm*—Oblon, Fisher, Spivak, McClelland & Maier

[57] ABSTRACT

A mixture of liquid crystals having a mesophase of the disc-like with wires-type, where a sensitivity to the electrical field can be observed and application can be made to visual display cells. The mixture comprises two hexasubstituted triphenylene derivatives, to the nucleus of which are fixed six identical radicals in positions 2, 3, 6, 7, 10 and 11, which can be alkyl, alkoxy, alkylcarboxylate, alkylbenzoate, and alkoxybenzoate radicals. The electro-optical devices can either be of the variable birefringence type when the liquid crystal molecules have their optical axes parallel to one another and to the walls of a display cell, or of the type with a variable rotatory power under the action of an electrical field when a helical type arrangement is used, or finally, under the effect of a relatively strong field, of the type with dynamic light diffusion.

11 Claims, 11 Drawing Figures

MIXTURE OF DISC-LIKE LIQUID CRYSTALS, ELECTRO-OPTICAL DEVICE USING SUCH A MIXTURE AND PROCESS FOR ORIENTING THE MOLECULES OF THE MIXTURE

BACKGROUND OF THE INVENTION

The invention relates to a mixture of a novel type of liquid crystals in the form of triphenylene derivatives which are sensitive to the electrical field and therefore usable in electrooptical devices. They are called disc-like or discotic liquid crystals.

It is known that the hitherto used liquid crystals are nematic or cholesteric liquid crystals on the one hand and smectic liquid crystals on the other. These products are formed from long or rod-like molecules.

The constitution of electrooptical cells is also known and they use nematic, smectic or cholesteric rod-like molecules and a survey thereof is given, for example, in articles such as "Etudes sur les applications à la visualisation des cristaux liquides, les tendances" (Studies of the tendencies in the uses of liquid crystals for visual display purposes) by M. HARENG and S. LE BERRE, Annales de Physique, 1978, Vol.3, p.317or "Electrooptical applications of liquid crystals" by J. D. MARGERUM et al in the Journal of Colloid and Interface Science, Vol.58, No.3, March 1977.

Recently, liquid crystals differing from rod-like liquid crystals have been discovered, cf for example the article "Une mesophase disquotique" (A disc-like mesophase) by J. Billard, JC DUBOIS, Nguyen Huu TINH and A. ZANN in Nouveau Journal de Chimie, Vol.2, No.5, p.535, 1978. These liquid crystals are formed from disc-like molecules present in the carbon-containing mesophases, but which had not previously been isolated. A disc-like polymorphism exists, so that there are several types of disc-like mesophases.

It has been found in the laboratories of the Applicant company that by mixing certain triphenylene derivatives low temperature liquid crystals are obtained having a so-called "thread" disc-like mesophase sensitive to the electrical field. The "thread" disc-like mesophase is also called "highly fluid meosphase," "fluid mesophase" or "nematic disc-like mesophase," these latter terms being used in Nguyen Huu Tinh et al., Physics Letters, Vol. 72 A, No. 3, pages 251–254 (1979).

BRIEF SUMMARY OF THE INVENTION

The present invention therefore relates to a mixture of liquid crystals comprising at least two hexasubstituted triphenylene derivatives, to the nucleus of which are fixed six identical radicals in the 2, 3, 6, 7, 10 and 11 position and which can be:

| | |
|---|---|
| $C_mH_{2m+1}O-$ | (derivatives "A") |
| $C_mH_{2m+1}-$ | (derivatives "B") |
| $C_mH_{2m+1}-COO-$ | (derivatives "C") |
| $C_mH_{2m+1}-\bigcirc-COO-$ | (derivatives "D") |
| $C_mH_{2m+1}O-\bigcirc-COO-$ | (derivatives "E") | m being an integer between 4 and 21.

BRIEF DESCRIPTION OF THE DRAWINGS

The invention is described in greater detail hereinafter relative to non-limitative embodiments of the invention and the attached drawings, wherein show.

DETAILED DESCRIPTION OF THE PREFERRED EMBODIMENTS

Figure 1:
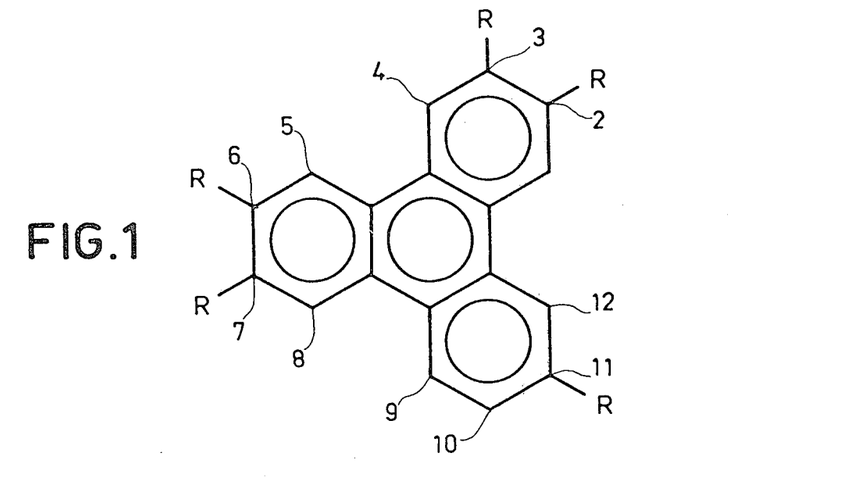
FIG. 1 a triphenylene derivative nucleus diagram.

FIG. 1 shows a triphenylene nucleus in accordance with chemical conventions. It has four aromatic nuclei, namely a central hexagonal nucleus to three non-consecutive sides of which are joined three other nuclei. On numbering from 1 to 12, the apices normally having a hydrogen atom (not shown as is conventionally the case) by rotating around the central nucleus in counterclockwise direction a radical R is found at positions 2, 3, 6, 7, 10 and 11. Such a molecule gives the impression of a disc, in accordance with a symbolism which would appear to be justified by what is stated hereinafter.

Figure 2:
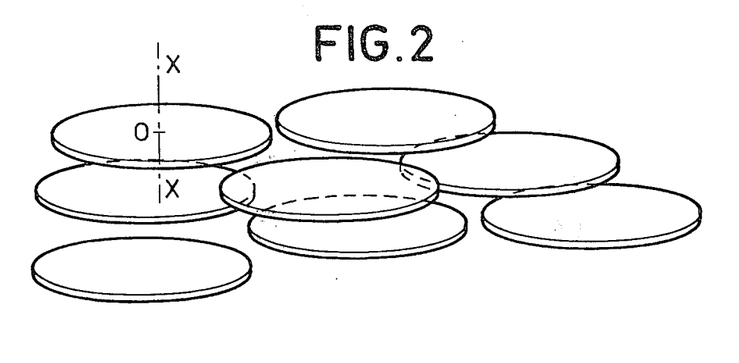
FIG. 2 symbolically, a disc-like mesophase structure.

FIG. 2 shows the structure of the disc-like mesophase based on the observation with a polarizing microscope. A mixture according to the invention has a thread like texture, hence the name thread like mesophase and the symbol $D_F$ used hereinafter. With the exception of the thermal agitation, the only order in this mesophase is the parallelism of the planes of adjacent molecules. The orientations of the molecules in these planes and the positions in space of the mass centres of the molecules are orderless.

The mixtures with mesophase $D_F$ are sensitive to the electrical field. The molecules of such mixtures have a dielectric anisotropy. For a weak electrical field of approximately 0.6 V/micron the molecule is oriented in the electrical field in such a way that the optical axis (XX in FIG. 1 passing through the molecule centre 0) becomes substantially parallel to the electrical field direction.

Figure 3:
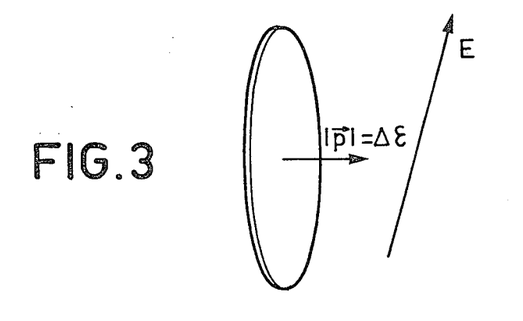
FIG. 3 an explanatory sketch of the sensitivity to the electrical field.

FIG. 3 represents a molecule by a disc D, its dielectric anisotropy by a vector p of module. $\Delta\epsilon$, and the electrical field by a vector E. Under these conditions, the molecule is oriented by rotating the positive anisotropy vector in accordance with the arrow F, the mixture being sufficiently fluid in the case of the mesophase to enable the molecules to be rapidly oriented.

For an electrical field exceeding 0.6 V/micron there is an electrohydrodynamic instability causing the light diffusion phenomenon.

Example of a mixture according to the invention

The mixture prepared in exemplified manner has 70% of moles of a derivative of series C with m=7, i.e. $C_7$ and 30% of a derivative of series D with m=8, i.e. $D_8$.

By varying from 30 to 90%, the proportion of the latter derivative it is also possible to obtain a mixture conforming with the characteristics of the invention.

The formulas of radicals R are respectively:

for the derivative $D_8$; n $C_7H_{15}$—C O O for the derivative $C_7$.

Each derivative is synthesized by reacting cold in pyridine hexahydroxytriphenylene and an acid chloride corresponding to the chosen radical.

Figure 4:
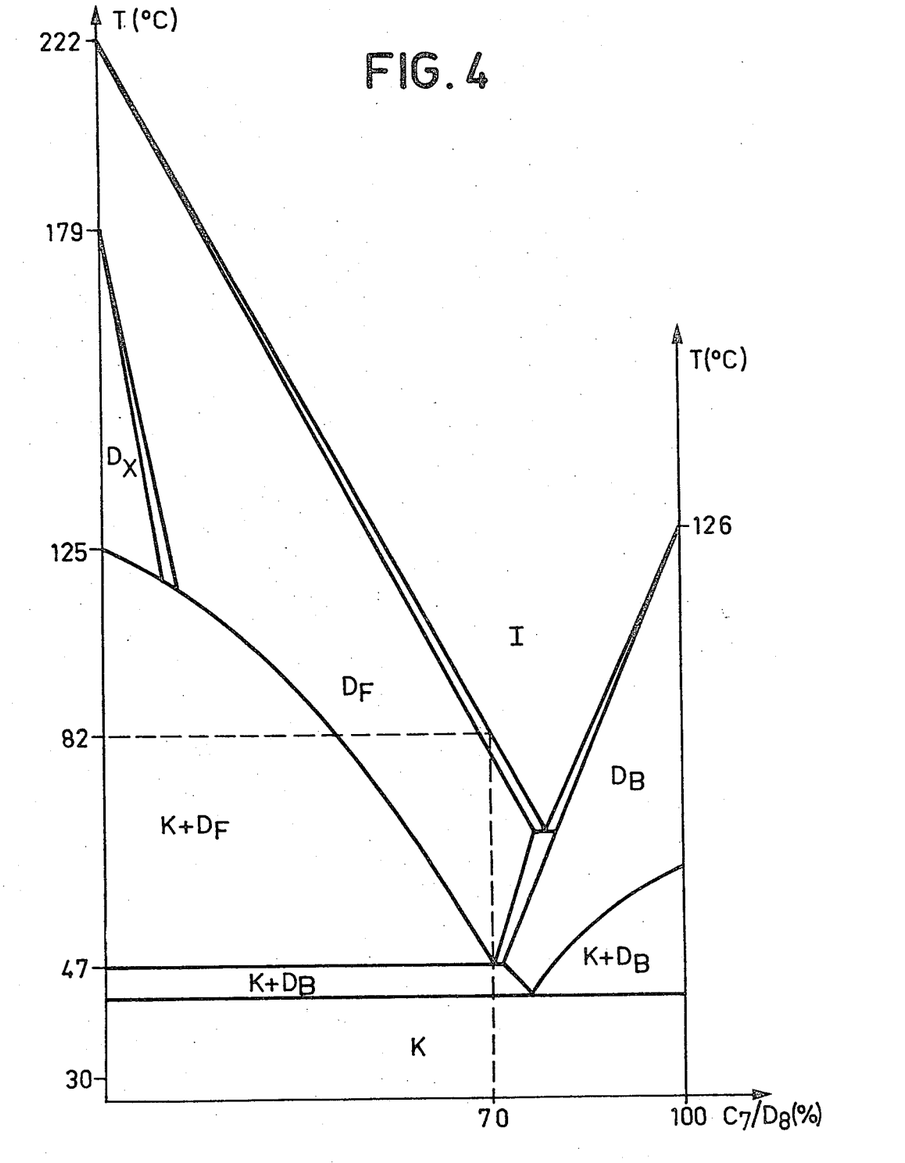
FIG. 4 a phase diagram relating to the mixture according to the invention.

The phase diagram of FIG. 4 shows the properties of the mixture in the most general case where the proportions of derivative $C_7$ are varied from 0 to 100%. The main areas of the diagram are designated by the following symbols:

K for the solid crystalline phase
I for the liquid phase
D for the disc-like phase, $D_F$ designating the disc-like phase with threads according to the invention,
$D_X$ a disc-like phase with a mosaic texture and
$D_B$ a disc-like phase with columns.

It can be seen that the mixture of 70% moles of $C_7$ and 30% moles of $D_8$ come very close to the eutectic, has a first melting point at 47° C., the characteristics of this mixture being symbolized as follows:

On assuming a position at the two ends of the diagram, it is possible to find the characteristics of the derivatives in the pure state, i.e.:

A mixture is obtained with identical properties by using a derivative $C_7$ and a derivative of series E, which could give m=9.

The mixture according to the invention differs from known liquid crystals by the sign of its birefringence and is optically negative uniaxial.

It has been stated that the molecules of the disc-like phase with threads have a dielectric anisotropy, which means that their permittivity is different when measuring in an electrical field parallel to the optical axis compared with that measured in a field perpendicular to the optical axis.

In the case of the mixture referred to hereinbefore, with 70% of derivative $C_7$ and 30% of derivative $D_8$ there is a positive anisotropy:

$\epsilon_\parallel - \epsilon_\perp = +0.2$.

As a result of the properties referred to hereinbefore of the mixtures according to the invention, it is possible to obtain the following phenomena by applying thereto a.c. or d.c. fields in accordance with suitable intensities and directions:

birefringence variation
variation of the rotatory power of the light polarization plane
dynamic diffusion of light.

The electrooptical devices according to the invention are of the type having at least one visual display cell, which itself has means for containing a liquid crystal sheet and means for applying an electrical field to the liquid crystal molecules. It is mainly characterized in that the liquid crystal has a disc-like mesophase which is sensitive to the electrical field. Furthermore, except in the case of a display cell by dynamic effect it is necessary to include in the device light polarization means.

Figure 5:
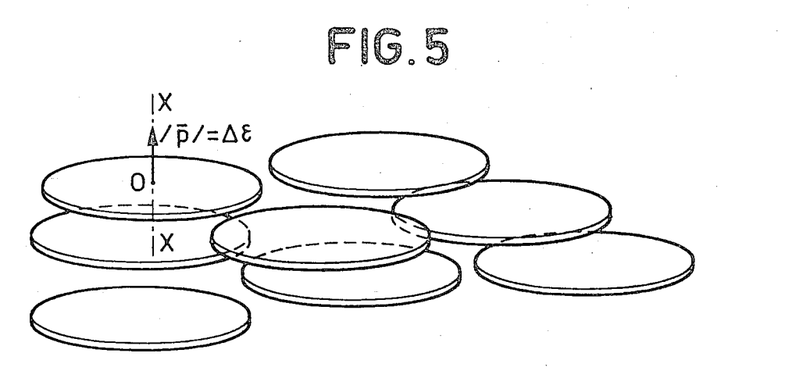
FIG. 5 symbolically, a group of liquid crystal molecules in the thread disc-like mesophase beyond the influence of an electrical field.

In the absence of an electrical field, the disc-like mesophase $D_F$ can be symbolically represented by a pile of parallel discs, whereof a sample is illustrated in FIG. 5. The optical axis XX of a molecule passing through the centre of the disc is shown, together with a vector located on the axis XX, whose modulus "p" represents the dielectric anisotropy of the molecule.

Figure 6:
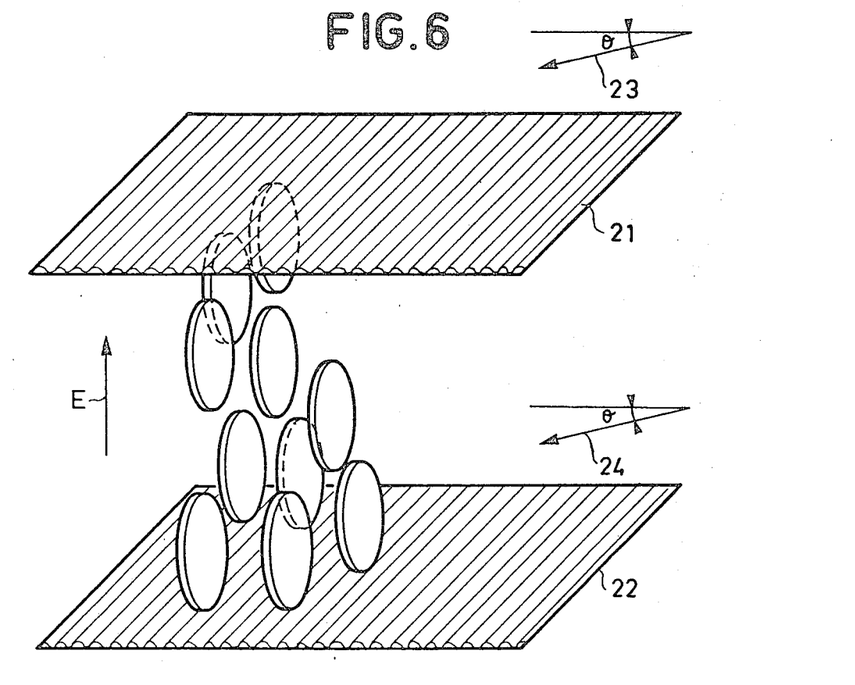
FIGS. 6 and 7 the arrangement of the molecules in a visual display cell.

FIG. 6 partly shows the arrangement of the molecules in accordance with the symbolism of FIG. 5 in the case when they are arranged between two planar supports 21, 22 (shown without thickness) coated with deposits of SiO.

These SiO deposits with a thickness of a few hundred Angstroms have a special structure obtained in the following manner. The two supports are arranged in parallel in a cathodic sputtering apparatus in such a way that the deposits are made obliquely in directions forming an angle $\theta$ with a parallel to the supports shown in FIG. 6 by arrows 23 and 24. The deposits have structures undulating in the same direction perpendicular to the arrows. This structure aids the arrangement of discs parallel to planes perpendicular to arrows 23 and 24.

An electrical field symbolized by an arrow E can be created by applying a potential difference between planes 21 and 22, i.e. between transparent electrodes on supports 21, 22. For a potential difference of a few volts, typically 0.6 to 6 V between electrodes 10 microns apart, there is a birefringence variation causing a colour variation between crossed polarizers. An electrooptical device can also be used for manifesting the colour change of a dichroic dye added to the liquid crystal.

The birefringence change can be explained by the orientation effect of the electrical field on the disc-like molecules having a dielectric anisotropy of the negative uniaxial type. In the presence of the electrical field, the molecule is oriented in such a way that the dipole moment perpendicular to the disc plane becomes parallel to the electrical field, thus producing a tilting of the molecules initially perpendicular to the planes of the supports.

Figure 7:
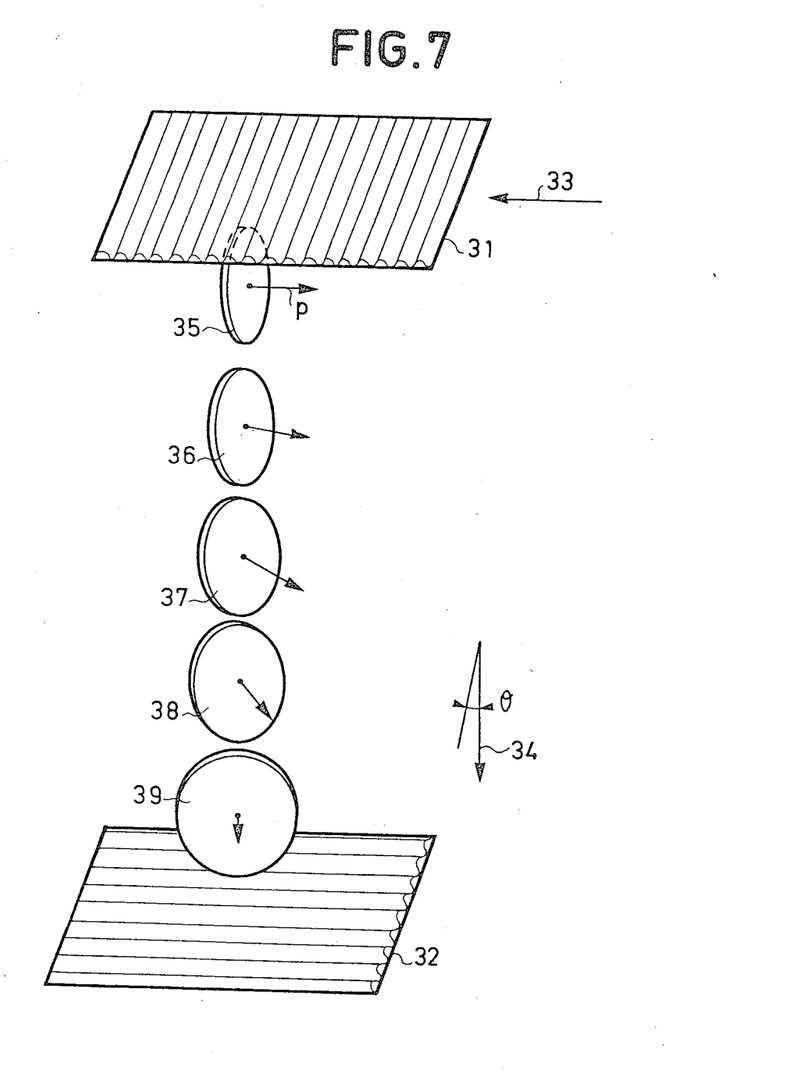

Using the same symbolism, FIG. 7 shows the arrangement of certain of the molecules of the liquid crystal placed between two supports identical to supports 21 and 22 in FIG. 6 with the difference that one of said supports has turned by an angle of 90° in its own plane. A sequence of molecules 35 to 39 at different distances from support 31 has been shown with the vectors representing the dipole moments p. Disc 35 is perpendicular to arrow 33 representing the direction in which the silica is deposited on support 31. Disc 39 is perpendicular to arrow 34 representing the direction in which the silica is deposited on support 32. The intermediate molecules 36 to 38 are oriented in intermediate directions. This manner of arranging the molecules can be expressed by stating that the ends of the vectors p are located on a helix, whose pitch is equal to four times the distance between the electrodes. Such a liquid crystal has a polarized light rotatory power. This rotatory power disappears when a continuous potential difference of 0.5 to 2 or 3V is established between electrodes arranged on supports 31 and 32, which are 10 microns apart. Thus, the electrical field E perpendicular to supports 31 and 32 tilts the discs, which then become parallel to the electrodes by eliminating the cause of the rotatory power and by in this way producing an extinction of the light on observing the latter, after passing through the liquid crystal between two crossed polarizers.

Figure 8:
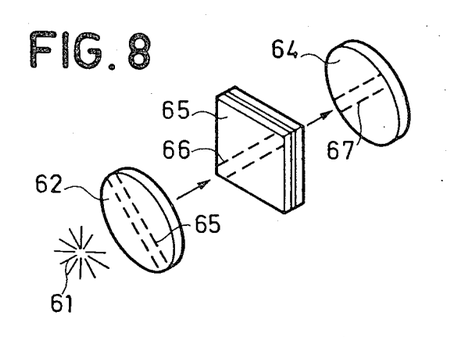
FIG. 8 a sectional view of a liquid crystal display cell.
Figure 9:
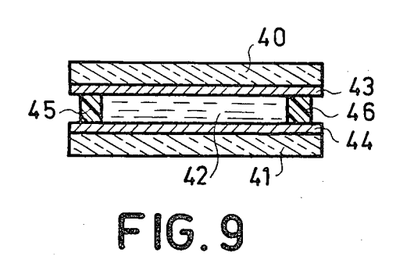
FIG. 9 an example of display cell electrodes.
Figure 10:
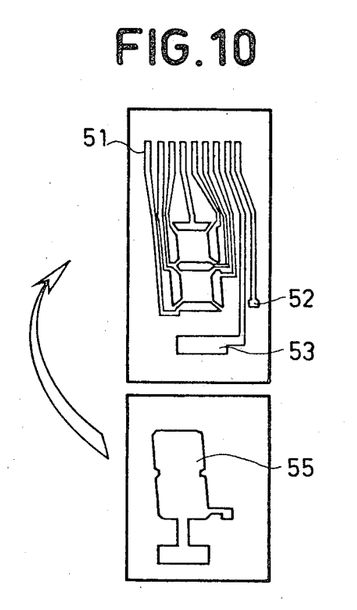
FIG. 10 an exploded diagram of a field effect device according to the invention.

FIGS. 8 and 9 show a visual display cell and an example of the electrodes of such a cell. FIG. 10 diagrammatically shows the cell between two crossed polarizers.

The cell has two transparent and insulating supports 40 and 41, which are for example glass plates. These supports are covered by electrodes 43 and 44, whereof at least one is transparent (one in the case of the cell used with reflected light). There is a very small distance of approximately 10 microns between these supports, which is maintained by means of insulating shims 45 and 46. A liquid crystal drop 42 is placed between the shims. The electrodes can either be in alpha-numeric form or in the form of lines, the lines of one electrode being perpendicular to those of the opposite electrode, thus forming a display matrix. The device may or may not have a diffuser and a reflector.

FIG. 9 shows in exemplified manner, an alpha-numeric system of electrodes, whose figures have seven elements such as electrode 51. Two other elements 52 and 53 complete the system. The opposite support has a single electrode 55.

In FIG. 10, the light emitted by source 61 is polarized by transmission across a polarizer 62 in accordance with a plane 62 and then transmitted by a cell 63 of the type shown in FIG. 3 rotating the polarization plane by 90° when no electrical voltage is applied between its electrodes. At 66, is shown the line on the outlet face of the cell of the light polarization plane and at 67 the line of the same plane on a polarizer 64 crossed with polarizer 62. Under these conditions, light is transmitted, whilst it is extinguished on applying a voltage to cell 63.

A display cell containing a liquid crystal in disc-like mesophase can also be used by utilizing the dynamic diffusion effect. As the molecules are of the negative uniaxial type, this effect is manifested under a sufficiently high a.c. or d.c. voltage. When the arrangement is homeotropic, i.e. if the optical axis of the molecules is perpendicular to the cell walls and consequently parallel to the electrical field, the dynamic diffusion effect is observed for a d.c. voltage of 5 to 6V with an interelectrode spacing of 10 microns.

Figure 11:
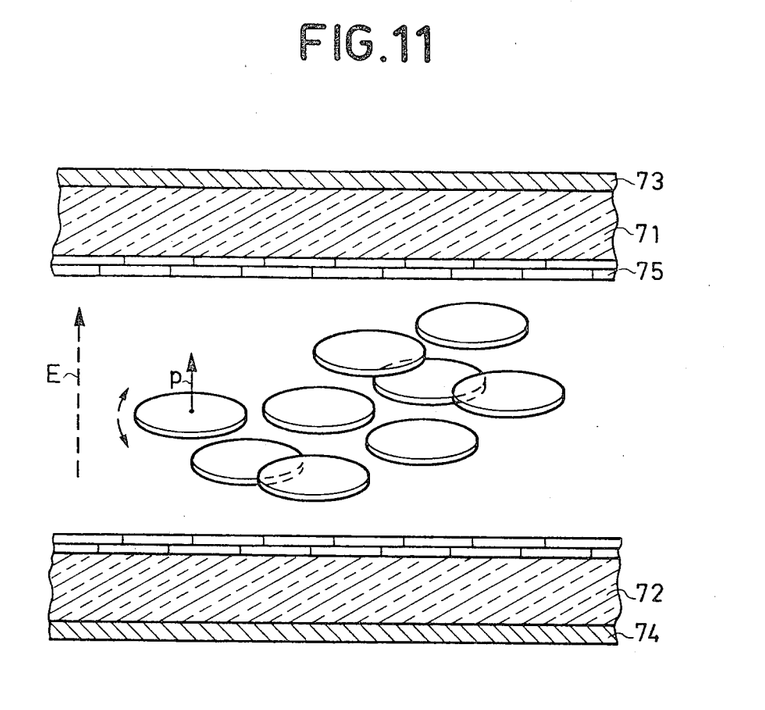
FIG. 11 a dynamic effect visual display.

FIG. 11 shows a dynamic effect visual display device having two glass plates 71 and 72, covered with transparent electrodes 73 and 74 on the outside in the manner shown, but usually on the inside.

On the inner face of the glass plates, i.e. the side in contact with the liquid crystal in mesophase $D_F$ is deposited by a process described hereinafter a coating of a hydrophilic substance 75, whose aromatic molecules have a structure like that of mellitic acid with the following structural formula:

For this purpose, mellitic acid can be replaced by hexahydroxybenzene or hexahydroxytriphenylene. The result obtained is an arrangement of the molecules in accordance with the positions of discs parallel to the cells of the substance, which itself has cells parallel to the wall.

On applying the electrical voltage between electrodes 73 and 74, the resulting electrical field E (a.c. or d.c.) brings about a disorganization of the discs. The initially transparent cell becomes opaline, thus revealing the presence of the electrical field.

The process used for depositing the substance such a mellitic acid involves dipping the glass plates in a hydroalcoholic solution of the substance.

What is claimed is:

1. A mixture of liquid crystals having a nematic mesophase consisting essentially of a mixture of hexasubstituted triphenylene derivatives, the molecules of said derivatives being substituted in positions 2, 3, 6, 7, 10 and 11 with six identical substituent radicals wherein said mixture comprises a first derivative wherein the substituent radicals have the formula and a second derivative wherein the substituent radicals have the formula wherein the proportions of said first derivative and said second derivative are chosen so that the nematic mesophase exists over a temperature range useful in a liquid crystal electro-optical display device.

2. A mixture of liquid crystals according to claim 1, wherein the proportions of the first and second derivatives are respectively 70% and 30%.

3. A mixture of liquid crystals having a nematic mesophase consisting essentially of a mixture of hexasubstituted triphenylene derivatives, the molecules of said derivatives being substituted in positions 2, 3, 6, 7, 10 and 11 with six identical substituent radicals wherein said mixture comprises a first derivative wherein the substituent radicals have the formula and a second derivative wherein the substituent radicals have the formula wherein the proportions of said first derivative and said second derivative are chosen so that the nematic mesophase exists over a temperature range useful in a liquid crystal electro-optical display device.

4. A mixture of liquid crystals according to claim 3, wherein the proportions of the first and second derivatives are 70% and 30% respectively.

5. An electro-optical device comprising a visual display cell having means for confining a liquid crystal layer and means for applying an electric field to said liquid crystal layer, wherein the liquid crystal layer consists essentially of a nematic mesophase of a mixture of hexasubstituted triphenylene derivatives, the molecules of said derivatives being substituted in positions 2, 3, 6, 7, 10 and 11 with six identical substituent radicals wherein said mixture comprises a first derivative wherein the substituent radicals have the formula and a second derivative wherein the substituent radicals have the formula wherein m is an integer between 4 and 21.

6. The electro-optical device of claim 5, wherein the proportions of said first and second triphenylene derivatives are chosen to provide a temperature range for the nematic mesophase suitable for use in an electro-optical display.

7. An electro-optical device comprising a visual display cell having means for confining a liquid crystal layer and means for applying an electric field to said liquid crystal layer, wherein the liquid crystal layer consists essentially of a nematic mesophase of a mixture of hexasubstituted triphenylene derivatives, the molecules of said derivatives being substituted in positions 2, 3, 6, 7, 10 and 11 with six identical substituent radicals wherein said mixture comprises a first derivative wherein the substituent radicals have the formula and a second derivative wherein the substituent radicals are selected from the group consisting of wherein m is an integer between 4 and 21.

8. The electro-optical device of claim 7, wherein the proportions of said first and second triphenylene derivatives are chosen to provide a temperature range for the nematic mesophase suitable for use in an electro-optical display.

9. An electro-optical device according to claim 5 wherein said liquid crystal layer has a first major surface and a second major surface parallel to said first major surface and said means for confining said liquid crystal layer comprises a first cell wall having a planar surface adjacent to said first major surface of the liquid crystal layer and a second cell wall having a planar surface adjacent to said second major surface of the liquid crystal layer, said surfaces being coated with a silica deposit which, in the absence of an electric field, is able to orient the molecules of said liquid crystal layer in such a way that their optical axes are parallel to one another and to the planar surfaces.

10. A device according to claim 9, wherein the silica deposit on said planar surface of said first cell wall has its orientation displaced by 90° relative to that of the silica deposit on said planar surface of said second cell wall, whereby the molecules of the liquid crystal have a helical arrangement.

11. An electrooptical device according to claim 5, wherein said means for confining said liquid crystal layer has a planar surface adjacent to said liquid crystal layer, said surface being coated with a liquid crystal orienting compound selected from the group consisting of mellitic acid, hexahydroxybenzene and hexahydroxytriphenylene.

* * * * *